US012723434B2

(12) United States Patent
Guo et al.

(10) Patent No.: US 12,723,434 B2
(45) Date of Patent: Sep. 1, 2026

(54) ANTI-THEFT METHOD AND ANTI-THEFT WIRE LOCK

(71) Applicant: SHENZHEN WINS ELECTRONIC TECHNOLOGY CO., LTD., Shenzhen (CN)

(72) Inventors: Pingcheng Guo, Shenzhen (CN); Shengfei Zhao, Shenzhen (CN)

(73) Assignee: SHENZHEN WINS ELECTRONIC TECHNOLOGY CO., LTD., Shenzhen (CN)

( * ) Notice: Subject to any disclaimer, the term of this patent is extended or adjusted under 35 U.S.C. 154(b) by 90 days.

(21) Appl. No.: 18/812,665

(22) Filed: Aug. 22, 2024

(65) Prior Publication Data

US 2025/0314100 A1 Oct. 9, 2025

(30) Foreign Application Priority Data

Apr. 7, 2024 (CN) ......................... 202410407474.1

(51) Int. Cl.
*E05B 45/00* (2006.01)

(52) U.S. Cl.
CPC .................................. *E05B 45/005* (2013.01)

(58) Field of Classification Search
CPC .... E05B 45/005; E05B 67/003; G09F 3/0352; Y10T 70/491
USPC ............................................................. 70/53
See application file for complete search history.

(56) References Cited

U.S. PATENT DOCUMENTS

| | | | | |
|---|---|---|---|---|
| 3,772,645 | A * | 11/1973 | Odenz | B62H 5/003 340/432 |
| 4,776,188 | A * | 10/1988 | Dalaba | E05B 45/005 70/57 |
| 5,786,759 | A * | 7/1998 | Ling | E05B 67/006 70/DIG. 49 |
| 5,836,002 | A * | 11/1998 | Morstein | E05B 45/005 340/432 |
| 6,043,733 | A * | 3/2000 | Lind | B62H 5/20 340/427 |
| 8,068,027 | B2 * | 11/2011 | Auerbach | G09F 3/0352 340/539.11 |
| 2005/0231365 | A1 * | 10/2005 | Tester | G09F 3/0347 292/307 R |
| 2017/0103683 | A1 * | 4/2017 | Yazdi | G09F 3/0329 |

FOREIGN PATENT DOCUMENTS

| | | | | |
|---|---|---|---|---|
| CN | 104657769 A * | 5/2015 | | |
| DE | 2441053 A1 * | 3/1976 | | |
| EP | 1657387 A2 * | 5/2006 | | E05B 45/005 |
| NL | 1030651 C2 * | 6/2007 | | E05B 45/005 |
| WO | WO-2005028790 A1 * | 3/2005 | | G08B 13/1445 |

* cited by examiner

*Primary Examiner* — Suzanne L Barrett
(74) *Attorney, Agent, or Firm* — Birchwood IP

(57) ABSTRACT

Provided is an anti-theft method, which is suitable for a wire lock, a lock body is provided with a circuit, and a conductive wire of this circuit is arranged on a locking section, and when the conductive wire is disconnected, it is judged that the wire lock is opened.

18 Claims, 10 Drawing Sheets

ANTI-THEFT METHOD AND ANTI-THEFT WIRE LOCK

CROSS-REFERENCE TO RELATED APPLICATIONS

This application claims priority to Chinese Patent Application No. 202410407474.1, filed on Apr. 7, 2024, which is hereby incorporated by reference in its entirety.

TECHNICAL FIELD

The present disclosure relates to a lock, in particular to an anti-theft wire lock.

BACKGROUND

The wire lock is a kind of lock used in various fields, commonly used for containers, and the existing wire lock comprises a lock body with a wire rope, and the lock body is provided with a monitoring circuit for monitoring the locking state. When the wire rope is inserted into this lock hole; on the one hand, the wire rope serves as a locking component to complete the locking of the mechanical mechanism, and on the other hand, the wire rope itself is a conductor, which conducts the monitoring circuit as part of the monitoring circuit. When the monitoring circuit is turned on, the wire lock reports the locked status to the background. During the transportation of goods if someone cuts the wire rope, the monitoring circuit will change from on to off, and the wire lock will report the unlocking status to the background. Through this monitoring circuit, the time when the wire lock is opened can be obtained, so as tracing responsibility. During use, it is found that when the thief short circuits the wire rope as shown in FIG. 1, and then cuts the wire rope between the two short-circuiting contacts as shown in FIG. 2, then the monitoring circuit can be maintained while cutting the wire, in order to avoid the monitoring of the monitoring circuit, so that the time when the wire lock is opened cannot be known. How to prevent the occurrence of the above situation is an urgent problem to be solved in the industry.

SUMMARY

The present disclosure provides an anti-theft method, is suitable for a wire lock, a circuit is set up, and the conductive wire of the circuit is arranged on the locking section of the wire rope of the wire lock, and when the conductive wire is disconnected, it is judged that the wire lock is opened. Since the conductive wire of the circuit is arranged on the locking section of the wire rope, when the thief cuts the wire rope, the conductive wire of the circuit will also be cut, so that the wire lock can identify the information that the wire rope is cut.

Furthermore, the conductive wire is insulated from the locking section of the wire rope. The circuit of the conductive wire is independent of the monitoring circuit of the wire rope, and it is used as a separate circuit for judging the opening state of the wire rope.

Furthermore, the conductive wire is arranged on the entire area or at least part of the area of the locking section of the wire rope. Especially when covering the entire area, it makes it difficult for the thief to bypass the conductive wire and damage the wire rope.

Furthermore, the circuit is multiple, and multiple circuits are connected in parallel, and when the conductive wire in any of the circuits is disconnected, it is judged that the wire lock is opened. Adding multiple circuits with the same function can effectively improve overall stability. When one circuit fails, other circuits can still work normally. On the other hand, it can increase the difficulty for thieves to avoid anti-theft methods.

Furthermore, the circuit is a normally closed circuit, which can more easily and conveniently judge the state changes of the circuit. Compared with complex control logic, this can greatly reduce the misjudgment rate.

Furthermore, the circuit is connected to an MCU, and when the MCU identifies a change in the voltage or current signal of the circuit, it is judged that the wire lock is opened.

Furthermore, when the MCU identifies the circuit opens, it is judged that the wire lock is opened.

Furthermore, when the MCU identifies that the circuit suddenly opens, it is judged that the wire lock is opened. This can avoid the misjudgment and improve the accuracy of the judgment mechanism.

Furthermore, when the MCU identifies a sudden change in the voltage or current signal of the circuit, it is judged that the wire lock is opened.

Furthermore, when the MCU identifies that the current signal of the circuit suddenly becomes 0, it is judged that the wire lock is opened.

Furthermore, when the MCU judges that the wire lock is opened, the MCU records the opening time. In the event of theft, the investigator can view the opening time of the wire lock and use it as evidence to facilitate the tracing of responsibility.

Furthermore, the MCU is connected with a transmission module, and when the MCU judges that the wire lock is opened, the MCU sends a signal that the wire lock is opened through the transmission module. At the first moment when the conductive wire is disconnected, the MCU sends the opening time to the outside through the transmission module. It can increase the timeliness of anti-theft monitoring, and also increase the way to save anti-theft data, which is convenient for real-time monitoring or post-event tracing.

An anti-theft method, is suitable for a wire lock, a conductive wire is arranged on the locking section of the wire rope of the wire lock, and the conductive wire is connected in series into the monitoring circuit of the wire lock, when the wire rope of the wire lock is inserted into the lock hole, the monitoring circuit is turned on, when the conductive wire is disconnected, it is judged that the wire lock is opened. By connecting a conductive wire in series with its original monitoring circuit, and arranging the conductive wire on the locking section of the wire rope, when the thief cuts the wire rope, the conductive wire of the circuit will also be cut, so that the wire lock can identify the information that the wire rope is cut, and the anti-theft function can be realized.

Furthermore, the connecting points at the both ends of the conductive wire are located inside the lock body.

Furthermore, one end of the conductive wire is electrically connected to the power supply, and the other end is electrically connected to the fixed end of the wire rope.

Furthermore, the conductive wire is connected with the fixed end of the wire rope and/or the power supply by welding.

Furthermore, the conductive wire is insulated from the locking section of the wire rope. The circuit of the conductive wire is independent of the monitoring circuit of the wire rope, and it is used as a separate circuit for judging the opening state of the wire rope.

Furthermore, the conductive wire is arranged on the entire area or at least part of the area of the locking section of the wire rope. Especially when covering the entire area, it makes it difficult for the thief to bypass the conductive wire and damage the wire rope.

Furthermore, the monitoring circuit is connected to an MCU, and when the MCU identifies a change in the voltage or current signal of the monitoring circuit, it is judged that the wire lock is opened.

Furthermore, when the MCU identifies that the monitoring circuit opens, it is judged that the wire lock is opened.

Furthermore, when the MCU identifies that the monitoring circuit suddenly opens, it is judged that the wire lock is opened. This can avoid the misjudgment and improve the accuracy of the judgment mechanism.

Furthermore, when the MCU identifies a sudden change in the voltage or current signal of the monitoring circuit, it is judged that the wire lock is opened.

Furthermore, when the MCU identifies that the current signal of the monitoring circuit suddenly becomes 0, it is judged that the wire lock is opened.

Furthermore, when the MCU judges that the wire lock is opened, the MCU records the opening time. In the event of theft, the investigator can view the opening time of the wire lock and use it as evidence to facilitate the tracing of responsibility.

Furthermore, the MCU is connected with a transmission module, and when the MCU judges that the wire lock is opened, the MCU sends a signal that the wire lock is opened through the transmission module. At the first moment when the conductive wire is disconnected, the MCU sends the opening time to the outside through the transmission module. It can increase the timeliness of anti-theft monitoring, and also increase the way to save anti-theft data, which is convenient for real-time monitoring or post-event tracing.

An anti-theft wire lock is provided.

A lock body, the lock body is provided with a lock hole;

A wire rope, one end of the wire rope is connected to the lock body, and the other end is used to insert into the lock hole for locking;

A circuit, the conductive wire of the circuit is arranged on the locking section of the wire rope, and when the conductive wire is disconnected, it is judged that the wire lock is opened.

Furthermore, the conductive wire is arranged on the entire area or at least part of the area of the locking section of the wire rope.

Furthermore, a covering layer is covered on the locking section.

Furthermore, the conductive wire is outside the covering layer.

Furthermore, the conductive wire is arranged in the covering layer and insulated from the wire rope. By setting a covering layer, the conductive wire is physically integrated with the wire rope, so that it is difficult for the thief to separate the conductive wire and the wire rope for separate short circuits.

Furthermore, the covering layer is opaque. It makes the conductive wire and the wire rope visually integrated. The thief cannot distinguish the specific position of the conductive wire.

Furthermore, a sleeve is sleeved on the locking section of the wire rope, the sleeve is sleeved on the wire rope, and the conductive wire is embedded in the wall of the sleeve. On the one hand, the sleeve can protect the conductive wire from breaking too easily; on the other hand, the thief cannot know the exact location of the conductive wire in the sleeve.

Furthermore, a sleeve is sleeved on the locking section of the wire rope, the sleeve is sleeved on the wire rope, the sleeve is a double-layer sleeve, and the conductive wire is located between the inner and outer layers of the double-layer sleeve. On the one hand, the sleeve can protect the conductive wire from breaking too easily; on the other hand, the thief cannot know the exact location of the conductive wire in the sleeve. Placing the conductive wire between the double-layer sleeves is convenient for manufacturing and has a more stable and reliable structure, avoiding short circuits caused by conductive wires being too close to wire ropes.

Furthermore, the conductive wire is wound back and forth multiple times between the two ends of the locking section along the wire rope. The conductive wire can wrap the locking section as comprehensively as possible, it increasing the difficulty of evading anti-theft functions.

Furthermore, the conductive wire is enameled wire.

Furthermore, the connecting points at the both ends of the conductive wire are located inside the lock body. It ensures the stability of the connection points.

Furthermore, the circuit is a normally closed circuit.

Furthermore, the circuit is connected to an MCU.

Furthermore, one end of the conductive wire is electrically connected to the power supply, and the other end is electrically connected to the pin of the MCU.

Furthermore, the MCU is connected with a transmission module, and when the MCU judges that the wire lock is opened, the MCU sends a signal that the wire lock is opened through the transmission module. When the MCU judges that the wire lock is opened, it can transmit signals to the outside, including time signals, alarm signals, etc.

An anti-theft wire lock is provided.

A lock body, the lock body is provided with a lock hole;

A wire rope, one end of the wire rope is connected to the lock body, and the other end is used to insert into the lock hole for locking;

A conductive wire, the conductive wire is arranged on the locking section of the wire rope, the conductive wire is connected in series into the monitoring circuit of the wire lock, when the wire rope of the wire lock is inserted into the lock hole, the monitoring circuit is turned on, when the conductive wire is disconnected, it is judged that the wire lock is opened. By connecting a conductive wire in series with its original monitoring circuit, and arranging the conductive wire on the locking section of the wire rope, when the thief cuts the wire rope, the conductive wire of the circuit will also be cut, so that the wire lock can identify the information that the wire rope is cut, and the anti-theft function can be realized.

Furthermore, the conductive wire is connected with the fixed end of the wire rope and/or the power supply by welding.

Furthermore, the conductive wire is insulated from the locking section of the wire rope.

Furthermore, the conductive wire is arranged on the entire area or at least part of the area of the locking section of the wire rope.

Furthermore, a covering layer is covered on the locking section.

Furthermore, the conductive wire is outside the covering layer.

Furthermore, the conductive wire is arranged in the covering layer and insulated from the wire rope.

Furthermore, the covering layer is opaque.

Furthermore, a sleeve is sleeved on the locking section of the wire rope, the sleeve is sleeved on the wire rope, and the conductive wire is embedded in the wall of the sleeve.

Furthermore, a sleeve is sleeved on the locking section of the wire rope, the sleeve is sleeved on the wire rope, the sleeve is a double-layer sleeve, and the conductive wire is located between the inner and outer layers of the double-layer sleeve.

Furthermore, the conductive wire is wound back and forth multiple times between the two ends of the locking section along the wire rope.

Furthermore, the conductive wire is enameled wire.

Furthermore, the connecting points at the both ends of the conductive wire are located inside the lock body.

Furthermore, the monitoring circuit is connected to an MCU.

Furthermore, one end of the conductive wire is electrically connected to the pin of the MCU, and the other end is electrically connected to the fixed end of the wire rope.

Furthermore, the MCU is connected with a transmission module, and when the MCU judges that the wire lock is opened, the MCU sends a signal that the wire lock is opened through the transmission module.

The present disclosure sets up a circuit in the lock body and arranges the conductive wire of the circuit on the locking section. When the conductive wire is disconnected, it is judged that the wire lock is opened. The physical disconnection of conductive wires is converted into changes in electrical signals. The conductive wire is arranged on the locking section of the wire rope, When the thief cuts the wire rope, the conductive wire of the circuit will also be cut, allowing the wire lock to identify the information that the wire rope has been cut. This method prevents thieves from bypassing the monitoring circuit by short circuiting the wire rope, it improves the anti-theft effect.

BRIEF DESCRIPTION OF DRAWINGS

FIG. 9 and FIG. 10 are partially enlarged views of part A and part B of FIG. 8.

1—lock body; 2—wire rope; 3—sleeve; 31—outer layer of the sleeve; 32—inner layer of the sleeve; 4—first one-way lock; 5—PCB; 6—conductive wire; 6-1, 6-2: two ends of the conductive wire; 7—positioning module; 8—second one-way lock; 9—T-shaped rail; 10—T-shaped slider; 11—lock hole; 12—MCU; 12-1 voltage or current identification pin.

DETAILED DESCRIPTION OF THE EMBODIMENTS

In order to enable those skilled in the art to understand the present disclosure, a further detailed explanation of the present disclosure will be provided in conjunction with specific implementation methods.

Figure 1:
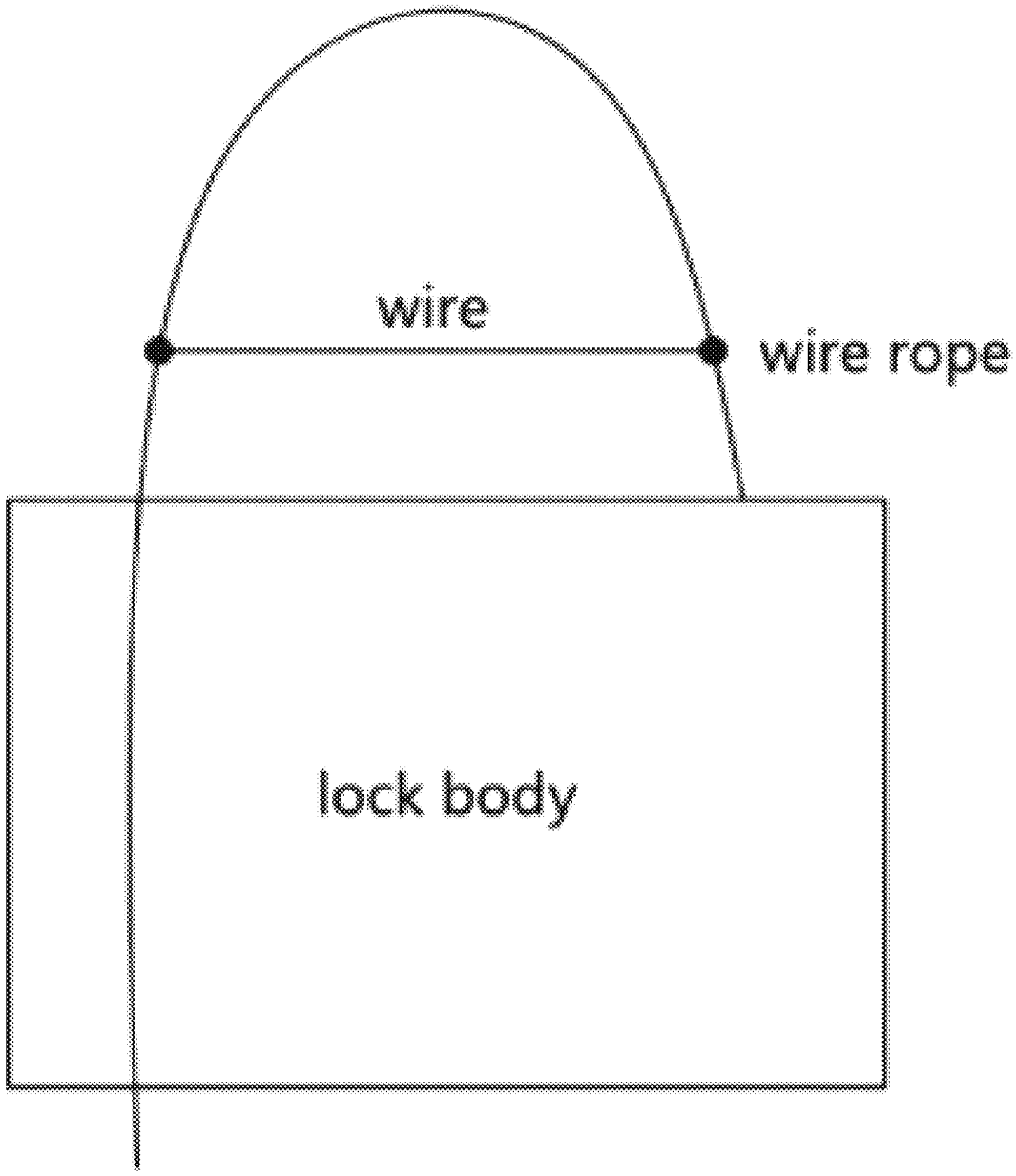
FIG. 1 (Prior art)
FIG. 1 is the schematic diagram one of the short circuits of the wire rope in the background art.
Figure 2:
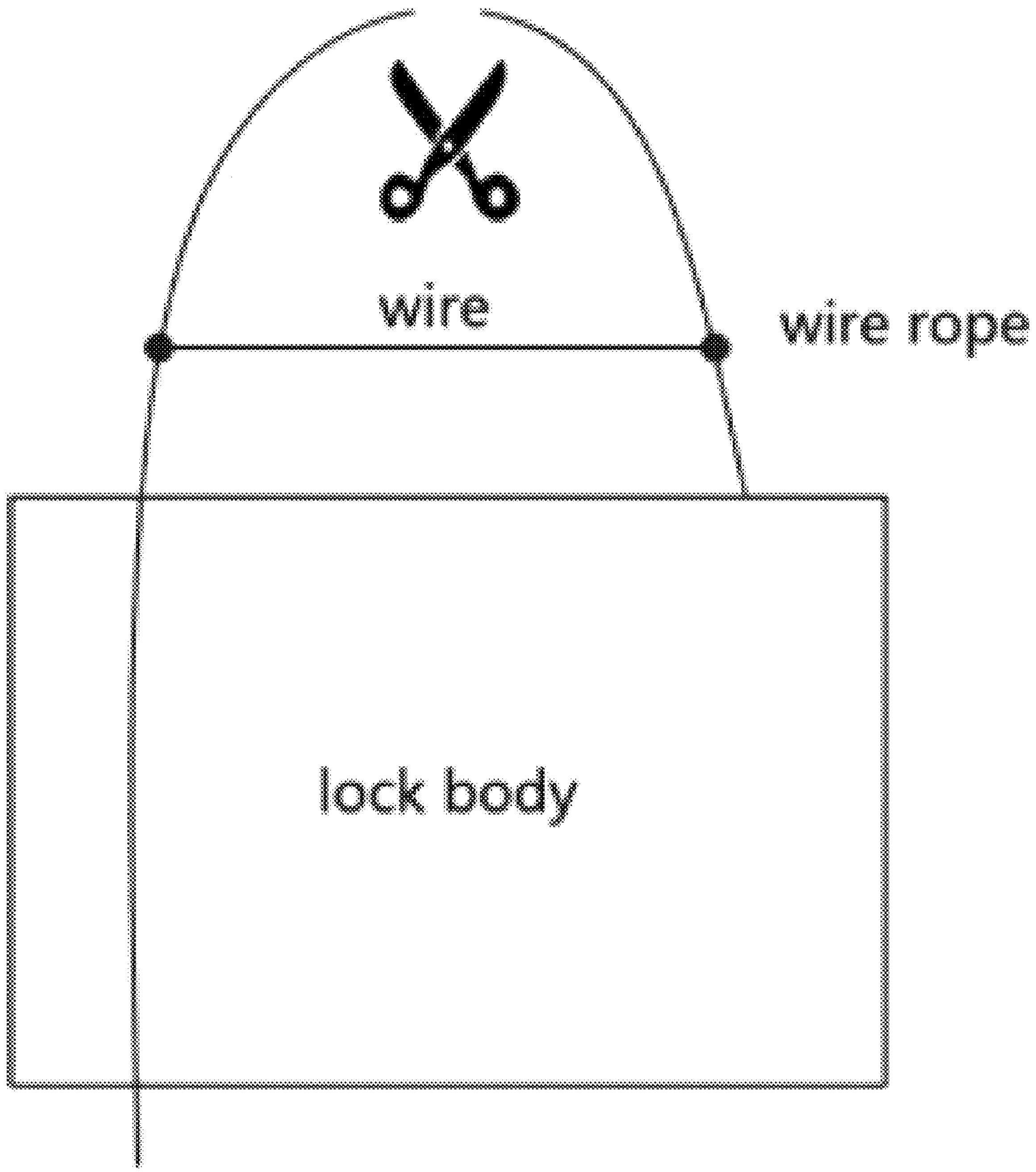
FIG. 2 (Prior art)
FIG. 2 is the schematic diagram two of the short circuits of the wire rope in the background art.
Figure 3:
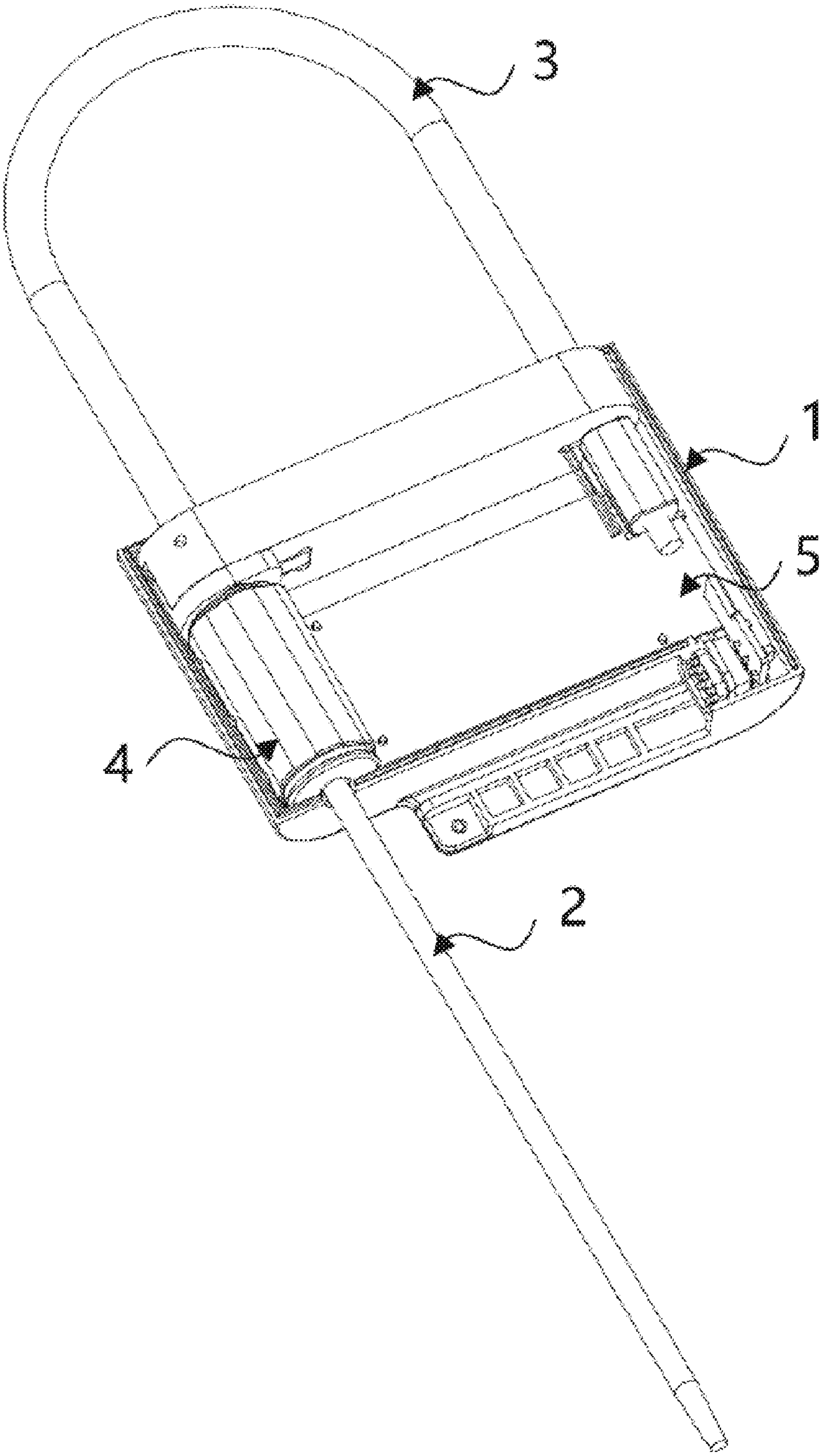
FIG. 3 is a schematic diagram of the structure of the wire lock of the present disclosure.
Figure 4:
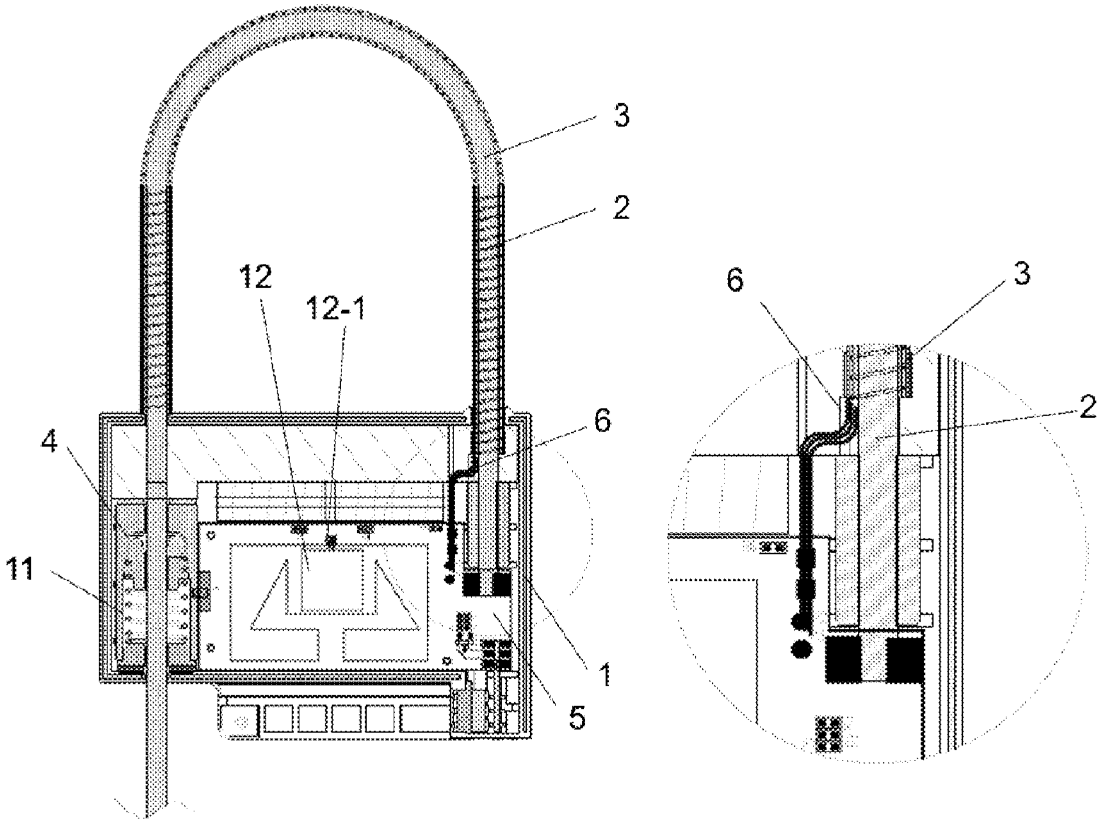
FIG. 4 is a schematic diagram of the cross-sectional structure of the wire lock of the present disclosure.

The embodiment provides an anti-theft method, which is suitable for the wire lock shown in FIG. 3, a circuit is arranged, and the conductive wire 6 of this circuit is arranged on at least a part of the area of the locking section of the wire rope 2, and the wire lock is judged to be opened when the conductive wire 6 is disconnected. In this embodiment, the circuit comprises an MCU 12 and a power supply, and the power supply is used for supplying power to the circuit and the MCU 12, wherein the MCU 12 and the power supply can be installed in a hard shell on the outer shell of the lock body 1 or inside the lock body 1. The MCU 12 has a voltage or current identification pin 12-1 (as shown in FIG. 4), and the conductive wire 6 is electrically connected to the voltage or current identification pin, and when the conductive wire 6 is disconnected, the signal identified by the identification pin can be transformed, and the signal that the conductive wire 6 is physically disconnected can be converted into an electrical signal. In this embodiment, the conductive wire 6 of the circuit is arranged on the locking section of the wire rope 2, and when the thief cuts the wire rope 2, the conductive wire 6 of the circuit will also be cut, so that the wire lock can identify the information that the wire rope 2 has been cut.

It should be noted that: the locking section of the wire rope referred to in the present disclosure is: the part of the wire rope between the fixed end and the lock hole 11, when the wire rope 2 is inserted into the lock hole 11 normally.

In this embodiment, the conductive wire 6 is insulated from the locking section of the wire rope 2, so that the circuit of the conductive wire 6 is independent of the monitoring circuit of the wire rope 2. The insulation method may include using enameled wire for conductive wire 6, or insulation medium can be installed between the locking section of the wire rope 2 and the conductive wire 6.

According to an embodiment of the present disclosure, the conductive wire 6 covers the area of the locking section as much as possible, the conductive wire 6 can be arranged on the area of more than 90% of the locking section, make it difficult for the thief to cut the locking section without damaging the conductive wire 6. The conductive wire 6 is preferably arranged throughout the entire area of the locking section.

According to one embodiment of the present disclosure, multiple conductive wires 6 are provided on the locking section, and multiple independent circuits are simultaneously formed. The multiple conductive wires 6 are all arranged on the locking section. When any of the conductive wires 6 of the circuit is disconnected, it is judged that the wire lock is opened. Adding multiple circuits with the same function can effectively improve overall stability. When one circuit fails, other circuits can still work normally. On the other hand, it can increase the difficulty for thieves to avoid anti-theft methods.

According to an embodiment of the present disclosure, the circuit is independent of the original monitoring circuit of the wire rope 2, and the circuit is a normally closed circuit. The circuit is connected to an MCU 12, and when the MCU 12 identifies a change in the voltage or current signal of the circuit, it is judged that the wire lock is opened.

The wire 6 is electrically connected to the identification pin of the MCU 12, and when the conductive wire 6 is disconnected, the voltage or current signal on the identification pin of the MCU 12 changes. The changes may include: increase, decrease or disappearance of voltage or current, etc.

Because the circuit in this embodiment comprises an MCU 12, the MCU 12 not only has an identification function, but also has the function of writing a program, so multiple implementation methods for judging the mechanism of tag lock opening, as follows:

Method 1: When the MCU 12 identifies that the circuit is off, it judges that the wire lock is opened.

Method 2: when the MCU 12 identifies that the circuit is suddenly off, it is judged that the wire lock is opened, which mainly refers to excluding the situation where the current signal gradually decreases until it disconnects, because in the case of power loss, the current and voltage in the circuit are slowly reduced, and finally reach the state of open circuit, so that the judgment logic can avoid the misjudgment and false alarm caused by the battery being unused for a long time or some batteries being in an abnormal state due to power loss.

Method 3: when the MCU 12 identifies a sudden change in the voltage or current signal of the circuit, it judges that the wire lock is opened. This judgment logic can avoid the misjudgment and false alarms caused by the battery being unused for a long time or some batteries being in an abnormal state due to power loss.

Method 4: when the MCU 12 identifies that the current signal of the circuit suddenly becomes 0, it judges that the wire lock is opened. This judgment logic can avoid the misjudgment and false alarms caused by the battery being unused for a long time or some batteries being in an abnormal state due to power loss.

According to an embodiment of the present disclosure, when the MCU 12 judges that the wire lock is opened, the MCU 12 records the opening time. In this embodiment, when the wire lock is judged to be opened, the wire lock records the opening time. In the event of a theft, investigators can trace it back by looking at the opening time.

According to an embodiment of the present disclosure, the MCU 12 is connected with a transmission module, and when the MCU 12 judges that the wire lock is opened, the MCU 12 sends a signal that the wire lock is opened through the transmission module. At the first moment when the conductive wire 6 is disconnected, the MCU 12 sends the opening time to the outside through the transmission module. It can increase the timeliness of anti-theft monitoring, and also increase the way to save anti-theft data, which is convenient for real-time monitoring or post-event tracing.

When judging that the wire lock is opened, the transmission module (or called data transmission module) of the wire lock sends an alarm signal. In this embodiment, the alarm signal can be wirelessly transmitted to other devices to realize the alarm, such as being transmitted to the siren through the network to carry out a wide range of reminders, and such as being transmitted to the corresponding client through the background for targeted notification. By sending an alarm signal, on the one hand, it can prompt the carrier so that it can deal with it in time, and on the other hand, it can notify other personnel related to the goods at the first time, so that they are aware of the situation of the goods in transit.

According to an embodiment of the present disclosure, the wire lock is provided with a GSM module, and when the MCU 12 judges that the wire lock is opened, the MCU 12 realizes external wireless communication with the outside through the GSM module, and the information that the wire lock is opened is sent to other terminal devices.

According to an embodiment of the present disclosure, The circuit is independent of the original monitoring circuit of the wire rope 2, and the circuit is a normally closed circuit.

Figure 5:
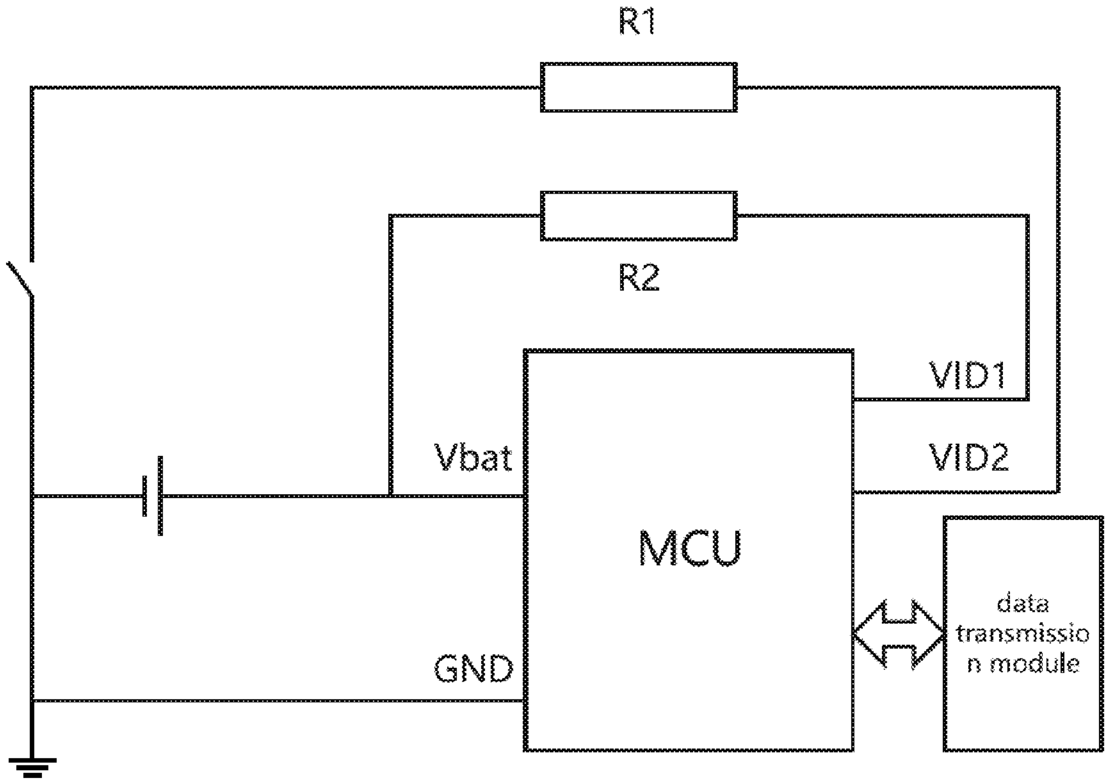
FIG. 5 is a circuit diagram of an independent circuit formed by conductive wires.

As shown in FIG. 5, resistor R2 represents conductive wire 6 arranged on the locking section of the wire rope 2, resistor R1 represents wire rope 2, and the power supply is used to supply power to the circuit and MCU 12. When wire rope 2 is inserted into the locking hole, the switch in the figure is closed and the circuit is conductive. In this embodiment, when the wire lock is locked, conductive wire 6 and wire rope 2 are both connected to their respective circuits. When either of the two circuits is off, it can be judged that the wire lock is opened, which can avoid thieves from creating the illusion of unopened by short circuiting wire rope 2.

According to an embodiment of the present disclosure, an anti-theft method is suitable for wire lock, arranges a conductive wire 6 on at least part of the area of the locking section of the wire rope 2, and connects the conductive wire 6 in series into the monitoring circuit of the wire lock, when the wire rope 2 of the wire lock is inserted into the lock hole 11, the monitoring circuit is turned on, when the conductive wire 6 is disconnected, it is judged that the wire lock is opened The method of the present embodiment can achieve anti-theft function without adding additional circuits.

Figure 6:
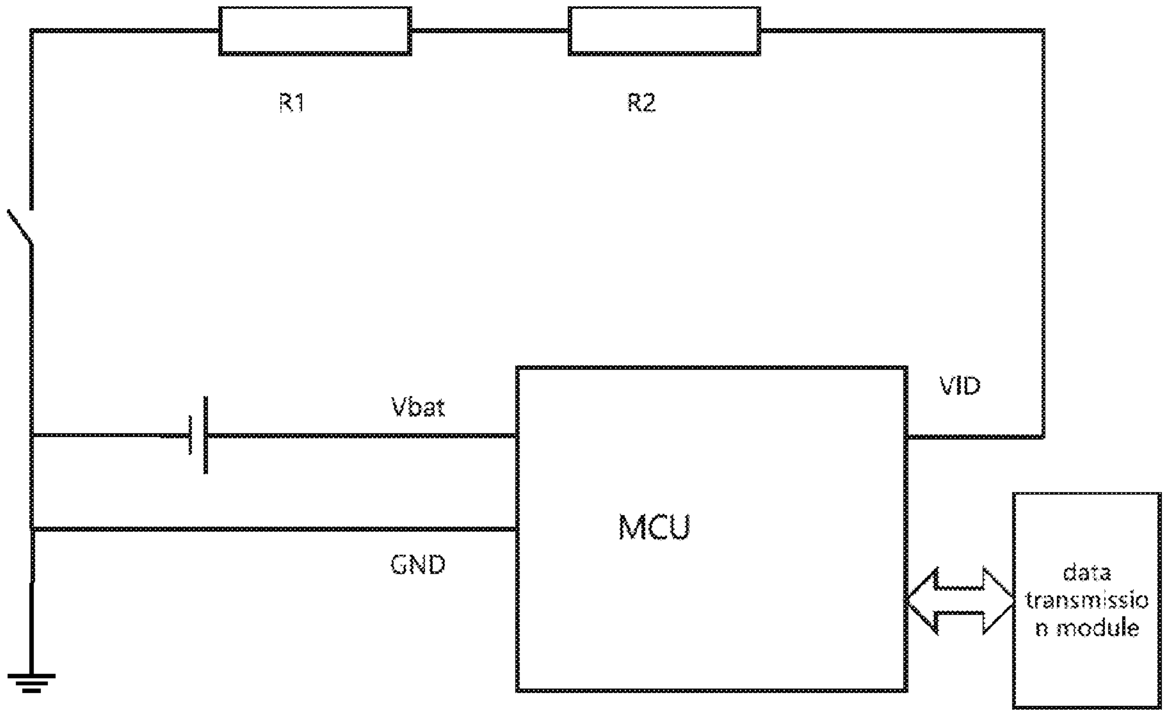
FIG. 6 is a circuit diagram of a circuit formed by connecting a conductive wire and the wire rope in series.

In this embodiment, one end of the conductive wire 6 arranged on the locking section of the wire rope 2 is electrically connected to the power supply, the other end is electrically connected to the fixed end of the wire rope 2, and the connecting points at the both ends of the conductive wire are located inside the lock body 1, such as the conductive wire 6 can be connected to the fixed end and the power supply by welding (for example, it can be brazing). The connecting point of the power supply in the present embodiment is the positive or negative terminal that is electrically connected to the power supply. That is, the conductive wire 6 is connected in series into the existing monitoring circuit of the wire lock, and is specifically connecting points between the fixed end of the wire lock and the power supply. Its circuit structure is shown as shown in FIG. 6, wherein resistor R2 represents the conductive wire 6, and resistor R1 represents wire rope 2, when any place of the conductive wire 6 or wire rope 2 is disconnected, can cause monitoring circuit to be off, and MCU 12 can identify the corresponding signal state change when circuit is off, thereby judge that the wire lock is opened.

In the embodiment of the connecting the conductive wire 6 in series with the wire rope 2, the two ends 6-1 and 6-2 of the conductive wire 6 are respectively connected to the fixed end and the power supply of the wire rope 2 by welding (for example, it can be brazing). The solution of setting up a separate circuit in the previous embodiment also applies to the implementation scheme of connecting the conductive wire 6 in series with the wire rope 2. For example, the spatial layout of conductive wire 6, the judge mechanism for opening the wire lock, and the functions of the MCU 12.

According to an embodiment of the present disclosure, the embodiment provides an anti-theft wire lock, as shown in FIGS. 3-4, and the anti-theft wire lock comprises: A lock body 1, the lock body 1 is provided with a lock hole 11;

A wire rope 2, one end of the wire rope 2 is connected to the lock body 1, and the other end is used to insert into the lock hole 11 for locking;

A circuit, the conductive wire 6 of the circuit is arranged on at least part of the area of the locking section on the wire rope 2, and when the conductive wire 6 is disconnected, it is judged that the wire lock is opened. The connecting points of two ends of the conductive wire 6 are all positioned inside lock body 1.

According to an embodiment of the present disclosure, the circuit is independent of the original monitoring circuit of the wire lock, and the circuit is a normally closed circuit. As shown in FIG. 5, resistor R2 represents conductive wire 6 arranged on the locking section of the wire rope 2, resistor R1 represents wire rope 2, and the power supply is used to supply power to the circuit and MCU 12. Wherein the fixed end of the wire rope 2 is connected to the VID2 pin of the MCU 12, the free end of the wire rope 2 is connected to the negative pole of the power supply by inserting the lock hole 11, so that the monitoring circuit is turned on, one end of the conductive wire 6 is connected to the positive pole of the power supply (in some scenarios, it can also be the positive pole of the power supply, as long as the circuit that the conductive wire 6 can be connected to the MCU 12), and the other end is connected to the VID1 pin of the MCU 12 (it can also be to the voltage identification pin in some scenarios, As long as the circuit that connects the conductive wire 6 to the MCU 12 can be realized). In this embodiment, after the wire lock is locked, the conductive wire 6 and the wire rope 2 are all connected to their respective circuits, and when any one of the two circuits is open, the wire lock can be judged to be opened.

In this embodiment, the MCU 12 is connected with a data transmission module, and when the MCU 12 judges that the wire lock is opened, the MCU 12 sends a signal outside, the signal may include a time signal, an alarm signal, etc.

In this embodiment, the power supply and the MCU 12 are arranged inside the lock body 1, a PCB 5 is arranged inside the lock body 1, an MCU 12 is arranged on the PCB 5, and two ends of the conductive wire 6 are connected into the circuit by connecting to the PCB 5.

In this embodiment, the conductive wire 6 is arranged on the entire area of the locking section of the wire rope 2.

In this embodiment, a covering layer is covered on the locking section. There are various ways to match the covering layer with the conductive wire 6. For example, if the conductive wire 6 is located outside the covering layer, the covering layer acts as an insulation layer, isolating the conductive wire 6 from the wire rope 2. In this case, the conductive wire 6 does not necessarily have to be an enameled wire; For example, the conductive wire 6 is arranged within the covering layer, closely attached to the wire rope 2, and insulated from the wire rope 2. In this case, the conductive wire 6 can be made of enameled wire; For example, when the conductive wire 6 is embedded in the cover layer, the cover layer not only isolates the contact between the conductive wire 6 and the wire rope 2, but also provides fixation for the conductive wire 6.

According to an embodiment of the present disclosure, the conductive wire 6 is embedded in the covering layer. By setting the covering layer, the conductive wire 6 is physically integrated with the wire rope 2, so that it is difficult for the thief to separate the conductive wire and the wire rope for separate short circuits. In this implementation, the covering layer uses insulation material. In addition to combining the wire rope 2 and the conductive wire 6 together, the wire rope 2 and the conductive wire 6 can also be wrapped in the covering layer, making it impossible to short-circuit the wire rope 2 or the conductive wire 6 through non-destructive means. The covering layer in this embodiment is formed by coating with insulating paint, or it can be formed by fitting a rubber or plastic tube onto the locking section of the wire rope 2.

Further, in this embodiment, the covering layer is opaque, and when the conductive wire 6 arranged on the locking section of the wire rope 2, the covering layer also covers the locking section, making the conductive wire 6 and the wire rope 2 visually integrated. The thief cannot distinguish the specific position of the conductive wire 6.

According to an embodiment of the present disclosure, as shown in FIG. 4, a sleeve 3 is sleeved on the locking section, and the conductive wire 6 is embedded in the wall of the sleeve 3. The conductive wire 6 forms a physically identical structure with the sleeve 3. When the thief attempts to evade the monitoring circuit by short circuiting the wire rope 2, it is necessary to expose the wire rope 2 covered by the sleeve 3, It is necessary to destroy the sleeve 3 of the locking section. When the thief breaks the sleeve 3, the conductive wire 6 inside it will also be damaged, and then the opening time or alarm signal will be sent out.

Figure 9:
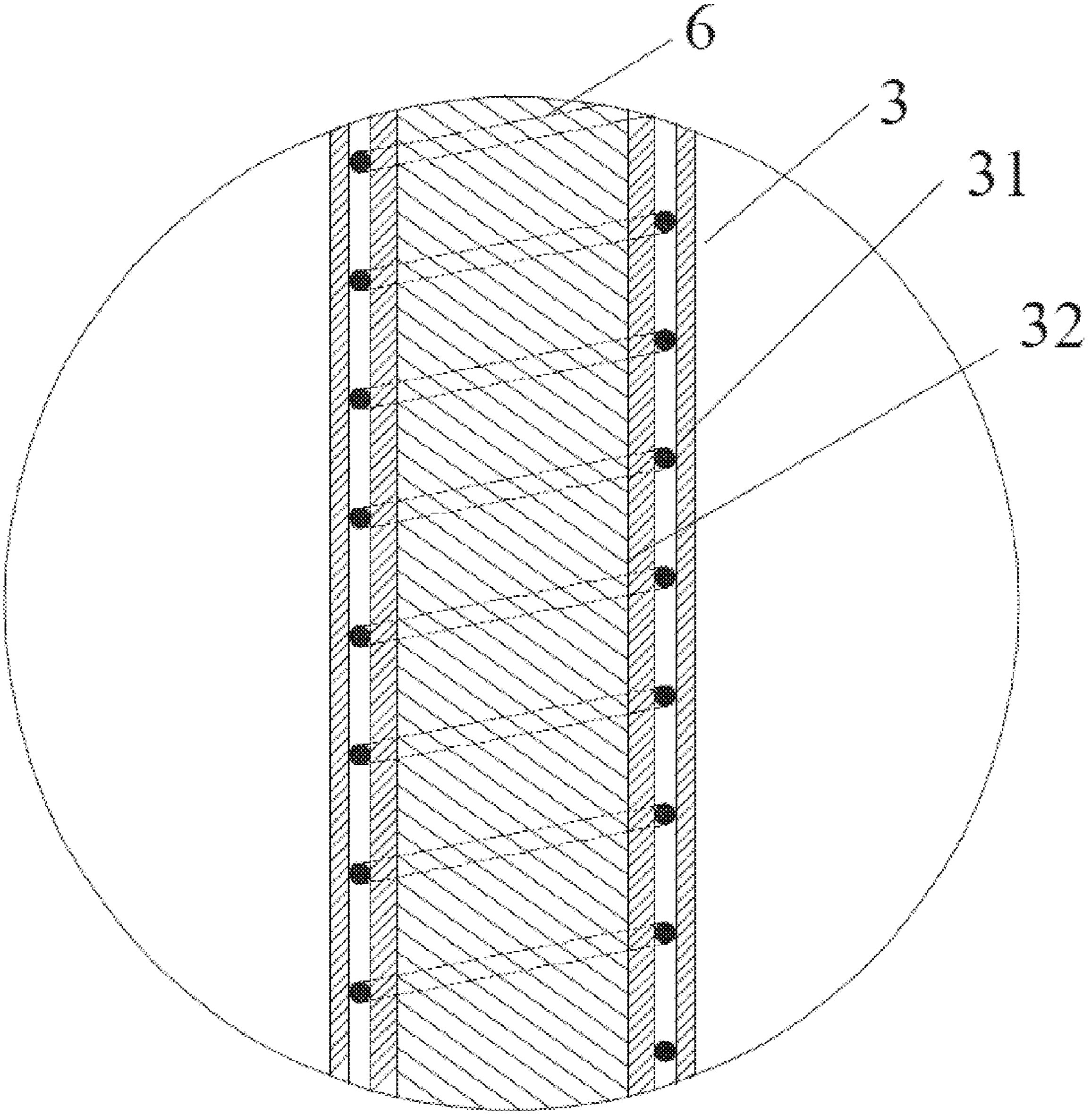

According to an embodiment of the present disclosure, a double-layer sleeve 3 is sleeved on the locking section, the double-layer sleeve 3 has an outer layer 31 and an inner layer 32, and the conductive wire 6 is located between the inner layer 32 and outer layer 31 of the double-layer sleeve 3, as shown in FIG. 9. Placing the conductive wire 6 between the double-layer sleeves 3 is convenient for manufacturing. During manufacturing, the conductive wire 6 is first arranged on the outside of the single-layer sleeve, and then, the outer layer material is covered onto the structure, forming a double-layer sleeve 3 with conductive wires 6 embedded in the middle layer. Alternatively, a double-layer sleeve 3 can be formed by directly nesting two sleeves, one large and one small. On the one hand, sleeve 3 can protect conductive wire 6 and prevent it from breaking too easily; On the other hand, it can prevent the thief from knowing the position of the conductive wire in the sleeve 3.

According to an embodiment of the present disclosure, the conductive wire 6 of the locking section is wound back and forth many times between the two ends of the locking section in the sleeve 3, as shown in FIG. 9, and the conductive wire 6 can wrap the locking section as much as possible, so as improving the difficulty of avoiding the conductive wire 6.

According to an embodiment of the present disclosure, in order to further improve the circumvention difficulty of avoiding the conductive wire 6. In this embodiment, the conductive wire 6 can be an enameled wire to insulate each intersection from each other.

According to an embodiment of the present disclosure, arrange a conductive wire 6 on at least part of the area of the locking section of the wire rope 2, and connect the conductive wire 6 in series into the monitoring circuit of the wire lock, when the wire rope 2 of the wire lock is inserted into the lock hole 11, the monitoring circuit is turned on, when the conductive wire 6 is disconnected, it is judged that the wire lock is opened. In this embodiment, one end of the conductive wire 6 arranged on the locking section of the wire rope 2 is electrically connected to the power supply, the other end is electrically connected to the fixed end of the wire rope 2, and the connecting points at the both ends of the conductive wire are located inside the lock body 1, such as the conductive wire 6 can be connected to the fixed end and the power supply by welding (for example, it can be brazing). The circuit structure is shown in FIG. 6, wherein resistor R2 represents the conductive wire 6, and resistor R1 represents wire rope 2, conductive wire 6 is located between wire rope 2 and the VID pin of MCU 12 (in some scenarios it can also be voltage identification pin, as long as conductive wire 6 can be connected into monitoring circuit), when wire rope 2 is inserted into the lock hole 11, wire rope 2 can electrical connection with the negative pole of power supply (in some scenarios it can also be connected with power supply negative pole or positive pole. As long as the conductive wire 6 can be connected into the monitoring circuit), when the conductive wire 6 or the wire rope 2 any place is disconnected, the MCU 12 can identify the corresponding signal state change, thereby the wire lock is judged to be opened. In this embodiment, the MCU 12 is also connected with a data transmission module, and when the MCU 12 judges that the wire lock is opened, a signal can be transmitted outside, and the signal may comprises a time signal, an alarm signal, etc.

Figure 8:
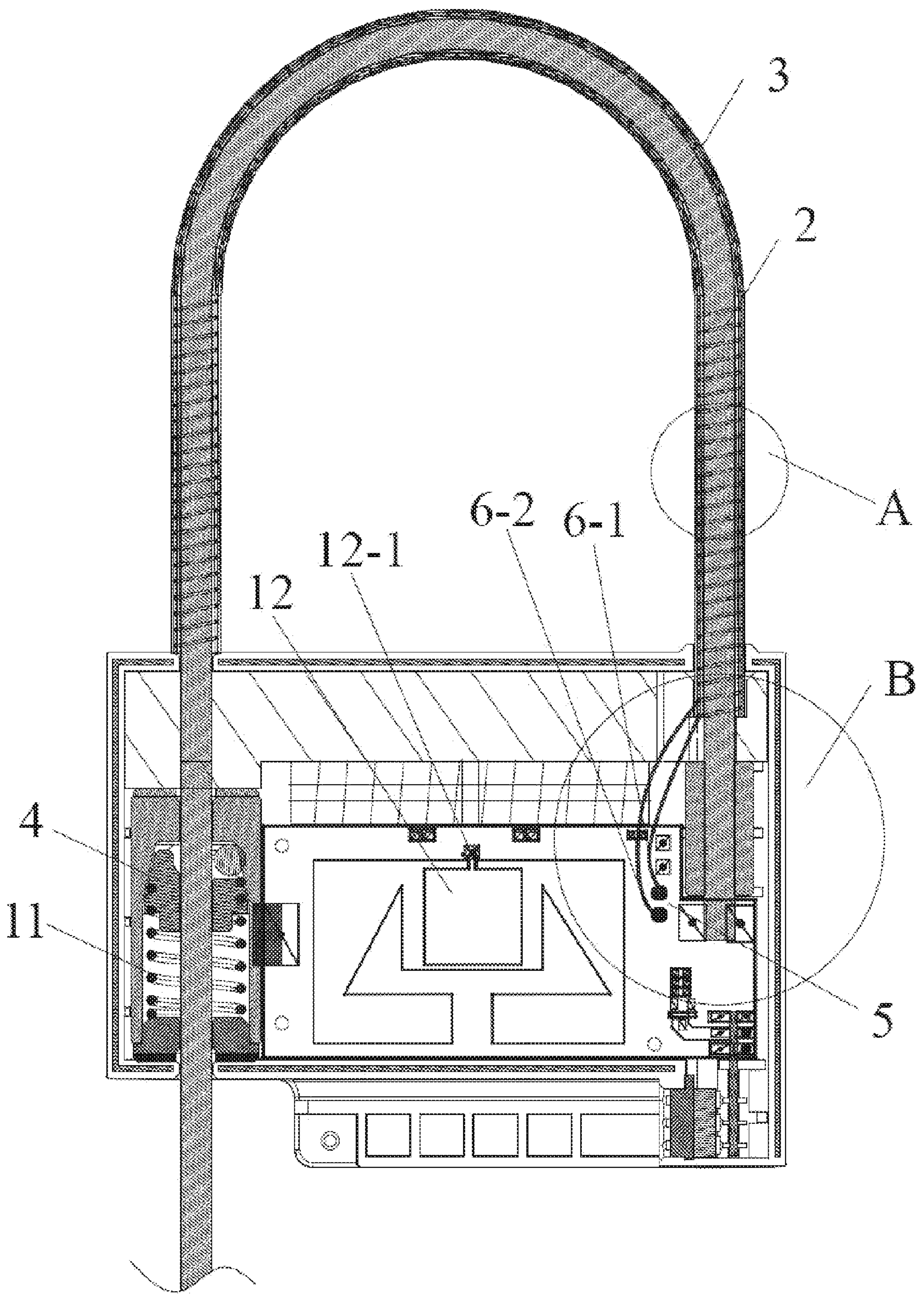
FIGS. 8, 9 and 10 are schematic diagrams of the cross-sectional structures of the wire lock of the present disclosure.
Figure 10:
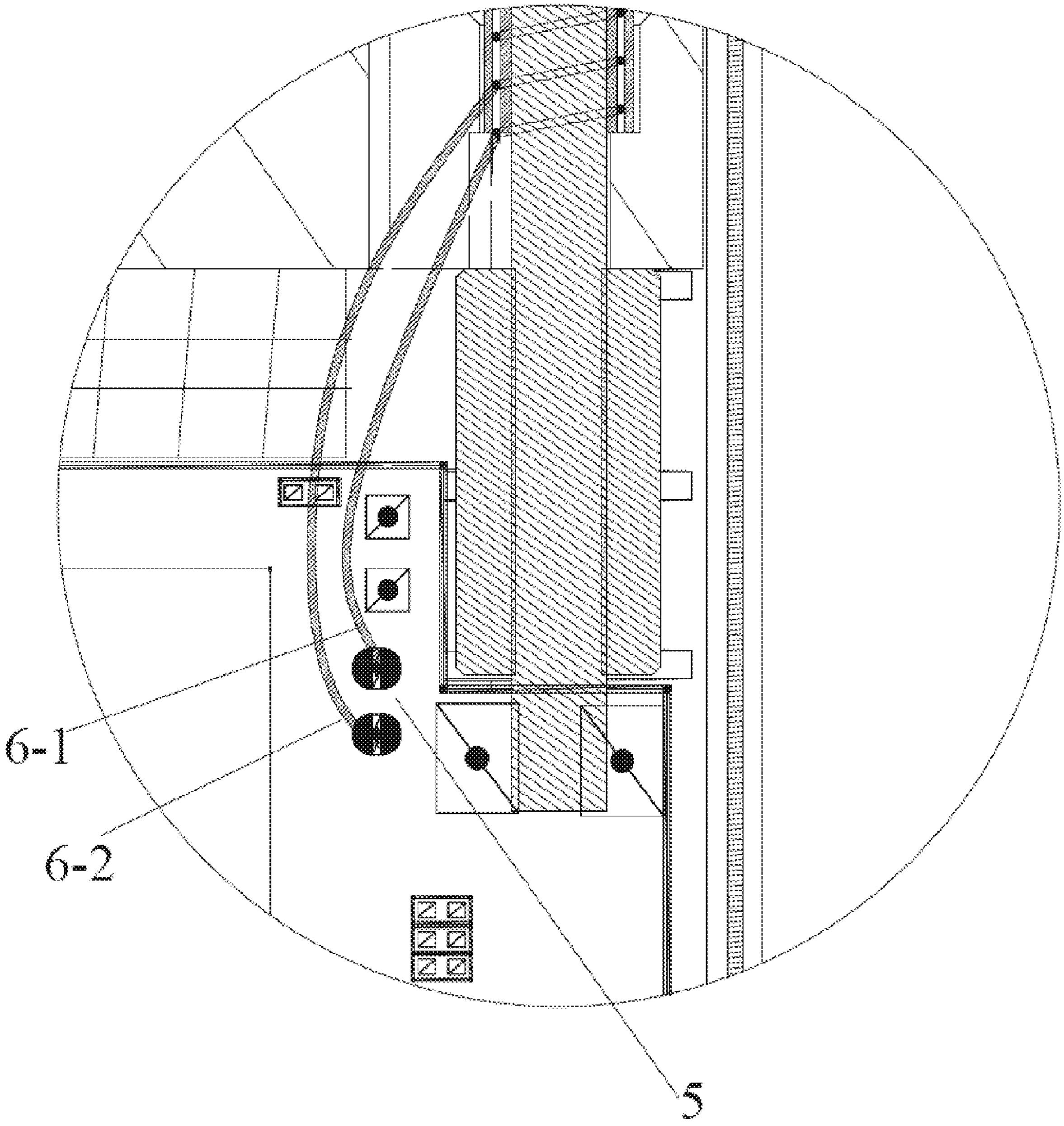

As shown in FIG. 6, the power supply and the MCU 12 are arranged inside the lock body 1, a PCB 5 is arranged inside the lock body 1, an MCU 12 is arranged on the PCB 5, and two ends 6-1 and 6-2 of the conductive wire 6 are connected into the circuit by connecting to the PCB 5, as shown in FIG. 8 and FIG. 10.

One end 6-2 of conductive wire 6 is connected to PCB 5, and the other end 6-1 is welded to the fixed end of the wire rope 2, as shown in FIG. 8 and FIG. 10.

In some embodiments, there is a first one-way lock 4 inside the lock body 1, which is electrically connected to the circuit. When the wire rope 2 is inserted into the first one-way lock 4 inside the lock body 1, the circuit is turned on, How to connect the steel wire rope 2 to the circuit by inserting it into the first one-way lock 4 is an existing technology in this field and will not be repeated.

Figure 7:
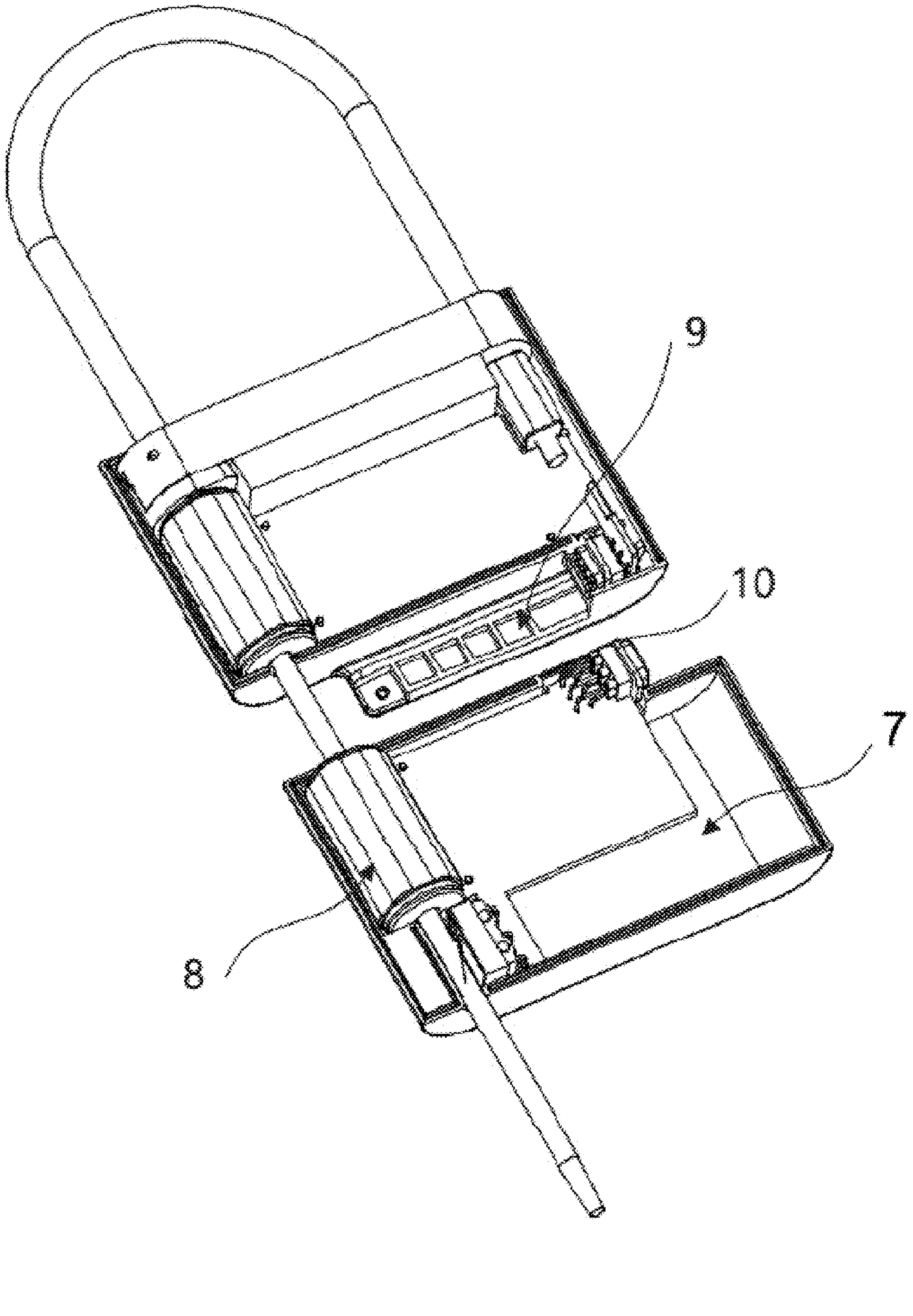
FIG. 7 is a schematic diagram of the structure of the wire lock in the present disclosure with a positioning module.

According to an embodiment of the present disclosure, as shown in FIG. 7, the anti-theft wire lock of the present disclosure further comprises a positioning module 7, a second one-way lock 8 is provided inside the positioning module 7, and the second one-way lock 8 is used for receiving the wire rope 2; and the positioning module 7 is connected with the lock body 1 with a detachable structure. By providing the positioning module 7, background can understand the position of the container and its locking state in real time, help the monitoring of the whole transportation process of container.

In this embodiment, the detachable structure is a T-shaped structure, and the T-shaped structure comprises a T-shaped rail 9 and a T-shaped slider 10 that is slidably matched with the T-shaped rail 9, wherein a T-shaped rail 9 is provided on the lock body 1, and a T-shaped slider 10 is provided on the positioning module 7. The lock hole 11 of the second one-way lock 8 is coaxial with the lock hole 11 of the first one-way lock 4.

Further, conductive protrusions can be provided on the surface of the T-shaped slider 10, contact points matched with the conductive protrusions are provided on the T-shaped rail 9, when the positioning module 7 is connected to the lock body 1 through the T-shaped rail 9, the conductive protrusions are in contact with the contact points and conducted, in this embodiment, the positioning module 7 is supplied with power through a power supply provided inside the lock body 1, and the power supply transmits electric energy to the positioning module 7 through the conductive protrusions and the contact points. Since the positioning module 7 is a recyclable component, in order to avoid battery replacement, its power supply is set inside the lock body 1. The lock body 1 is a disposable component, and the disassembled positioning module 7 is matched with a new lock body 1 when reused. After being matched with the lock body 1 through the T-shaped slider 10, it can be powered on, this embodiment can improve the convenience of repeated use of the positioning module 7.

The above is only the preferred embodiment of the present disclosure, and it should be noted that the preferred embodiment shall not be regarded as a restriction on the present disclosure, and the scope of protection of the present disclosure shall be subject to the scope limited by the claims. For a person of ordinary skill in the art, a number of improvements and embellishments may also be made without departing from the spirit and scope of the present disclosure, and these improvements and retouching shall also be regarded as the scope of protection of the present disclosure.

What is claimed is:

1. An anti-theft method for a wire lock, the method comprising:
- providing circuits;
- a conductive wire of the circuits is arranged on a locking section of a wire rope of the wire lock, the conductive wire is insulated from the locking section;
- when the conductive wire is disconnected, the wire lock is opened;
- one end of the conductive wire is electrically connected to a power supply, and another end of the conductive wire is electrically connected to a fixed end of the wire rope;
- the conductive wire is connected to the power supply and the fixed end of the wire rope by welding;
- a sleeve is sleeved on the locking section, or a covering layer is covered on the locking section;
- wherein the sleeve is a double-layer sleeve, and the conductive wire is provided between an inner layer and an outer layer of the double-layer sleeve;
- wherein the conductive wire is an enameled wire.

2. The anti-theft method according to claim 1, wherein the conductive wire is arranged on an entire area of the locking section.

3. The anti-theft method according to claim 1, wherein the circuit is multiple, and multiple circuits are connected in parallel, and when the conductive wire in any of the circuits is disconnected, and the wire lock is opened.

4. The anti-theft method according to claim 1, wherein the circuits are normally closed circuits;
- the circuits are connected to an MCU, and when the MCU identifies a change in voltage or current signal of the circuits, and the wire lock is opened;
- when the MCU identifies that the circuits open, and the wire lock is opened;
- when the MCU judges that the wire lock is opened, the MCU records an opening time.

5. The anti-theft method according to claim 4, wherein the MCU is connected with a transmission module, and when the MCU judges that the wire lock is opened, the MCU sends a signal that the wire lock is opened through the transmission module.

6. An anti-theft method for a wire lock, the method comprising:
- a conductive wire is arranged on a locking section of a wire rope of the wire lock, the conductive wire is insulated from the locking section;
- the conductive wire is connected in series into a monitoring circuit of the wire lock, when the wire rope is inserted into the lock hole, the monitoring circuit is turned on;
- when the conductive wire is disconnected, it is judged that and the wire lock is opened;
- one end of the conductive wire is electrically connected to a power supply, and another end of the conductive wire is electrically connected to a fixed end of the wire rope;

the conductive wire is connected to the power supply and the fixed end of the wire rope by welding;

a sleeve is sleeved on the locking section, or a covering layer is covered on the locking section;

wherein the sleeve is a double-layer sleeve, and the conductive wire is provided between an inner layer and an outer layer of the double-layer sleeve;

wherein the conductive wire is an enameled wire.

7. The anti-theft method according to claim 6, wherein two ends of the conductive wire are located inside a lock body.

8. The anti-theft method according to claim 6, wherein the conductive wire is arranged on an entire area of the locking section.

9. The anti-theft method according to claim 6, wherein when the MCU identifies the monitoring circuit opens, and the wire lock is opened;

when the MCU judges that the wire lock is opened, the MCU records an opening time.

10. The anti-theft method according to claim 9, wherein the MCU is connected with a transmission module, and when the MCU judges that the wire lock is opened, the MCU sends a signal that the wire lock is opened through the transmission module.

11. An anti-theft wire lock, comprising:

a lock body, the lock body is provided with a lock hole;

a wire rope, one end of the wire rope is connected to the lock body, and the other end is configured to insert into the lock hole for locking;

a circuit, a conductive wire of the circuit is arranged on a locking section of the wire rope, the conductive wire is insulated from the locking section, when the conductive wire is disconnected, and the wire lock is opened;

one end of the conductive wire is electrically connected to a power supply, and another end of the conductive wire is electrically connected to a fixed end of the wire rope;

the conductive wire is connected to the power supply and the fixed end of the wire rope by welding;

a sleeve is sleeved on the locking section, or a covering layer is covered on the locking section;

wherein the sleeve is a double-layer sleeve, and the conductive wire is provided between an inner layer and an outer layer of the double-layer sleeve;

wherein the conductive wire is an enameled wire.

12. The anti-theft wire lock according to claim 11, wherein the conductive wire is arranged on an entire area of the locking section.

13. The anti-theft wire lock according to claim 11, wherein connecting points at both ends of the conductive wire are located inside the lock body.

14. The anti-theft wire lock according to claim 11, wherein the circuit is a normally closed circuit;

the circuit is connected to an MCU;

the MCU is connected with a transmission module.

15. An anti-theft wire lock, comprising:

a lock body, the lock body is provided with a lock hole;

a wire rope, one end of the wire rope is connected to the lock body, and the other end is configured to insert into the lock hole for locking;

a conductive wire, the conductive wire is arranged on a locking section of the wire rope, the conductive wire is insulated from the locking section, the conductive wire is connected in series into a monitoring circuit of the wire lock, when the wire rope of the wire lock is inserted into the lock hole, the monitoring circuit is turned on, when the conductive wire is disconnected, and the wire lock is opened;

one end of the conductive wire is electrically connected to a power supply, and another end of the conductive wire is electrically connected to a fixed end of the wire rope;

the conductive wire is connected to the power supply and the fixed end of the wire rope by welding;

a sleeve is sleeved on the locking section, or a covering layer is covered on the locking section;

wherein the sleeve is a double-layer sleeve, and the conductive wire is provided between an inner layer and an outer layer of the double-layer sleeve;

wherein the conductive wire is an enameled wire.

16. The anti-theft wire lock according to claim 15, wherein connecting points at both ends of the conductive wire are located inside the lock body.

17. The anti-theft wire lock according to claim 15, wherein the monitoring circuit is connected to an MCU.

18. The anti-theft wire lock according to claim 17, wherein the MCU is connected with a transmission module.

* * * * *